(12) United States Patent
Niimura

(10) Patent No.: US 8,978,157 B2
(45) Date of Patent: Mar. 10, 2015

(54) MANAGING ACCESS TO DATA BASED ON DEVICE ATTRIBUTE INFORMATION

(75) Inventor: Kenji Niimura, Santa Clara, CA (US)

(73) Assignee: Ricoh Company, Ltd., Tokyo (JP)

( * ) Notice: Subject to any disclaimer, the term of this patent is extended or adjusted under 35 U.S.C. 154(b) by 161 days.

(21) Appl. No.: 13/467,356

(22) Filed: May 9, 2012

(65) Prior Publication Data

US 2013/0305314 A1    Nov. 14, 2013

(51) Int. Cl.
*G06F 21/62* (2013.01)
(52) U.S. Cl.
USPC ............ 726/27; 726/2; 726/3; 726/4; 726/26; 726/29
(58) Field of Classification Search
None
See application file for complete search history.

(56) References Cited

U.S. PATENT DOCUMENTS

| | | | |
|---|---|---|---|
| 7,428,578 B1 * | 9/2008 | Hull et al. | 709/206 |
| 8,065,713 B1 * | 11/2011 | Vainstein et al. | 726/2 |
| 2003/0081242 A1 * | 5/2003 | Simpson et al. | 358/1.15 |
| 2003/0234958 A1 * | 12/2003 | Fritz et al. | 358/1.16 |
| 2009/0009802 A1 * | 1/2009 | Shaw et al. | 358/1.15 |
| 2012/0069386 A1 * | 3/2012 | St. Laurent et al. | 358/1.15 |

OTHER PUBLICATIONS

Scarfone et al., Guide to Enterprise Telework and Remote Access Security, 2009, NIST Special Publication 800-46 Revision 1, pp. 1-46.*
Bertino et al. Location-Aware Authentication and Access Control—Concepts and Issues, 2009, IEEE, 2009 International Conference on Advanced Information Networking and Applications, pp. 10-15.*
Dempsey et al., Information Security Continuous Monitoring (ISCM) for Federal Information Systems and Organizations, 2011, NIST Special Publication 800-137, pp. 1-80.*

(Continued)

*Primary Examiner* — Kaveh Abrishamkar
*Assistant Examiner* — Adrian Stoica
(74) *Attorney, Agent, or Firm* — Hickman Palermo Truong Becker et al. LLP; Daniel D. Ledesma

(57) ABSTRACT

A technique involves receiving a request for certain data to be processed by a device and determining, based on an attribute of the device, whether to allow an operation to be performed on the data; after allowing the operation to be performed on the data: sending, to the device, a request for one or more characteristics of the device; in response to the request, receiving the one or more characteristics from the device; storing, based on the one or more characteristics, a second attribute that is associated with the device; after storing the second attribute: receiving a second request for second data to be processed by the device; determining, based on the second attribute of the device, whether to allow an operation to be performed on the second data; determining to not allow the second operation to be performed, wherein the device is capable of processing the second data.

20 Claims, 12 Drawing Sheets

(56) References Cited

OTHER PUBLICATIONS

Ray et al., LRBAC: A Location-Aware Role-Based Access Control Model, 2006, Springer-Verlag Berlin HeidelBerg, ICISS 2006, LNCS 4332, pp. 147-161.*

Jaros et al., A New Approach in a Multifactor Authentication and Location-based Authorization, 2011, IARIA, ICMP 2011: The Sixth International Conference on Internet Monitoring and Protection, pp. 50-53.*

Chadwick et al., The PERMIS X.509 Role Based Privilege Management Infrastructure, 2002, Elsevier Science BV, Pre-print version of Future Generation Computer System. 936 (2002), Dec. 1-13, 2002, pp. 1-18.*

Dempsey et al., Information Security Continuous Monitoring (ISCM) for Federal Information Systems and Organizations, Sep. 2011, National Institute of Standars and Technology, NIST Special Publication 800-137, pp. 1-80.*

* cited by examiner

TABLE 300

| ID | Name | password |
|---|---|---|
| USER1 | Jay | abcde |
| USER2 | Taro | efgge |
| USER3 | Kay | aidgg |
| ... | ... | ... |

FIG. 3

TABLE 400

| ID | Name | location | mobile | certified |
|---|---|---|---|---|
| DEVICE1 | device001 | US/NY/office01 | FALSE | TRUE |
| DEVICE2 | device002 | US/NY/office02 | FALSE | FALSE |
| DEVICE3 | device003 | US/NY/public | FALSE | TRUE |
| DEVICE4 | device004 | mobile | TRUE | FALSE |
| DEVICE5 | device005 | mobile | TRUE | TRUE |

FIG. 4

TABLE 500

| Location ID | Range definition |
|---|---|
| US/NY | IN_RANGE("NEW_YORK_STATE") |
| US/NY/office01 | AROUND("42.98053954751642",-75.56396484375",30) |
| US/NY/office02 | AROUND("43.4369659652182",-75.9045410156255",30) |
| US/NY/public | IN_RANGE(LOCATION1) && OUT_RANGE(LOCATION2, LOCATION3) |
| UNKNOWN | OUT_RANGE(LOCATION1) |

FIG. 5

TABLE 600

| APPLICATION | OPERATION | USER/GROUP | OPERATION DEVICE LOCATION | OPERATION DEVICE ATTRIBUTE | RELATED DEVICE(S) LOCATION | RELATED DEVICE(S) ATTRIBUTE | RULE ID |
|---|---|---|---|---|---|---|---|
| APPLICATION1 | login() | Group1 | US/NY/office1 | ANY | N/A | N/A | App1_login_rule_ok |
| | | | US/NY/office2 | ANY | N/A | N/A | App1_login_rule_ok |
| | | | US/NY/public | Certified | N/A | N/A | App1_login_rule_ok |
| | | | US/NY/public | Un-Certified | N/A | N/A | App1_login_rule_ng |
| | | | UNKNOWN | ANY | N/A | N/A | App1_login_rule_ng |
| | | Group2 | N/A | ANY | N/A | N/A | App1_login_rule_ng |
| | listDocument() | ANY | US/NY/office1 | Certified | N/A | N/A | App1_listDoc_level2 |
| | | ANY | US/NY/office1 | Un-Certified | N/A | N/A | App1_listDoc_level3 |
| | | ANY | US/NY/office2 | Certified | N/A | N/A | App1_listDoc_level1 |
| | | ANY | US/NY/office2 | Un-Certified | N/A | N/A | App1_listDoc_level2 |
| | | ANY | US/NY/public | ANY | N/A | N/A | App1_listDoc_level3 |
| | | ANY | UNKNOWN | ANY | N/A | N/A | App1_listDoc_level4 |
| | print() | ANY | US/NY/office1 | Certified | US/NY/office1 | Certified | App1_print_at_office_confidential |
| | | ANY | US/NY/office1 | Un-Certified | US/NY/office1 | ANY | App1_print_at_office_default |
| | | ANY | US/NY/office2 | Certified | US/NY/office2 | Certified | App1_print_at_office_confidential |
| | | ANY | US/NY/office2 | Un-Certified | US/NY/office2 | ANY | App1_print_at_office_default |
| | | ANY | ANY | ANY | US/NY/office1 or US/NY/office2 | ANY | App1_print_to_office_default |
| | | ANY | ANY | ANY | US/NY/public | ANY | App1_print_to_public_place |
| APPLICATION2 | operation1() | ANY | ANY | ANY | ANY | ANY | App2_operation1_default |
| | operation2() | ANY | ANY | ANY | ANY | ANY | App2_operation2_default |

FIG. 6

TABLE 700

| RULE ID | RULE |
|---|---|
| App1_login_rule_ok | Verify user name and password |
| App1_login_rule_ng | Login false |
| App1_listDoc_level1 | Show the list of document whose security level is level1. |
| App1_listDoc_level2 | Show the list of document whose security level is level2 or upper |
| App1_listDoc_level3 | Show the list of document whose security level is level3 or upper |
| App1_listDoc_level4 | Show the list of document whose security level is level4 or upper |
| App1_print_at_office_confidential | if target document level is level1<br>  Put watermark on the target document image;<br>  Return the release code of print job;<br>  Email this job record to Administrator;<br>else<br>  Print the document to the printer |
| App1_print_at_office_default | if target document level is level1<br>  Show the error message<br>else<br>  Print the document to the printer |
| App1_print_to_office_default | if target document level is level1<br>  Show the error message<br>else<br>  Show the release code of the print job |
| App1_print_to_public_place | if target document level is level2 or upper than level2<br>  Show the error message<br>else<br>  Put watermark on the target document image;<br>  Show the release code of the print job; |

FIG. 7

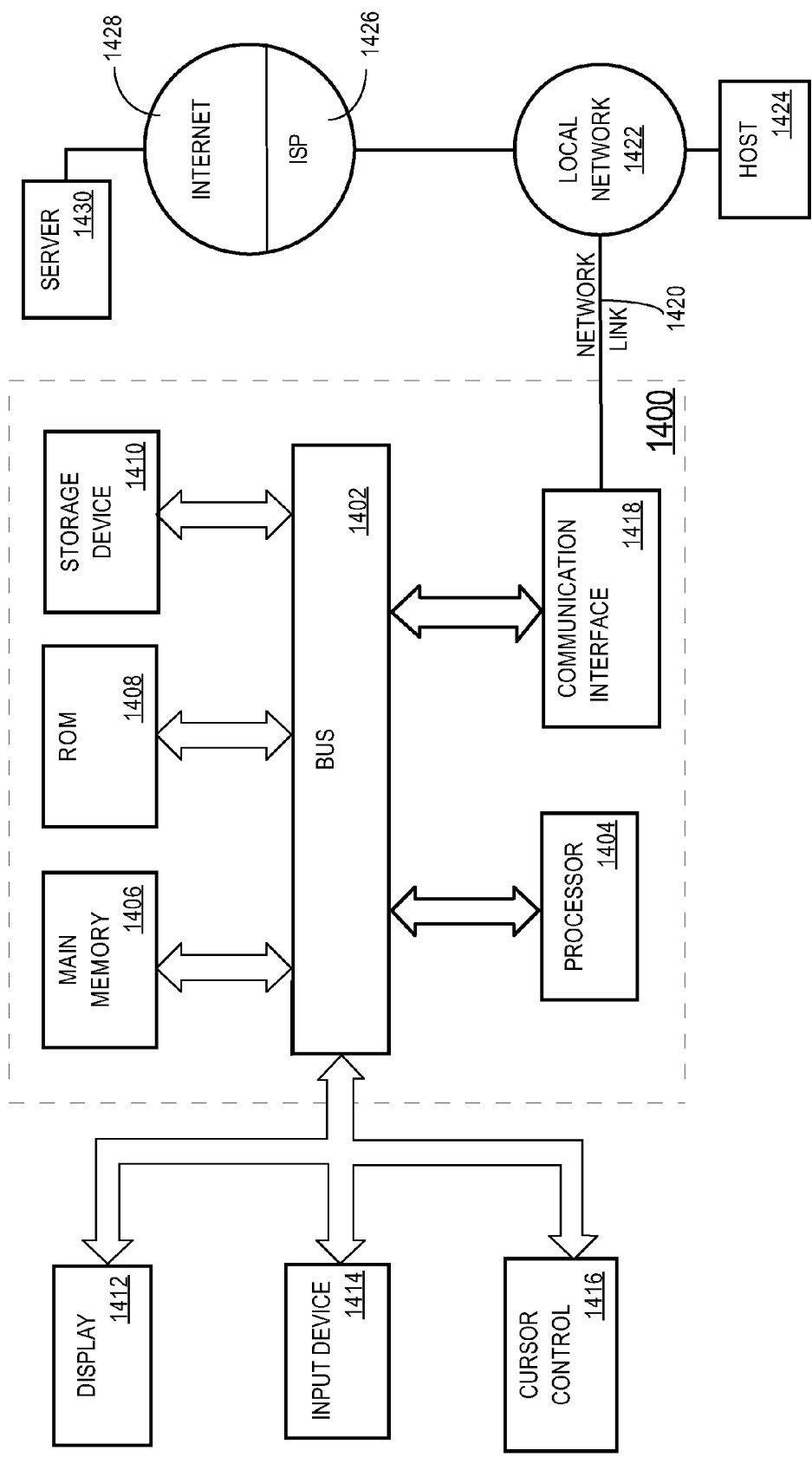

MANAGING ACCESS TO DATA BASED ON DEVICE ATTRIBUTE INFORMATION

CROSS-REFERENCE TO RELATED APPLICATIONS

This application is related to U.S. patent application Ser. No. 13/467,349 filed May 9, 2012, entitled "MANAGING ACCESS TO DATA BASED ON LOCATION INFORMATION"; the entire content of which is incorporated by this reference for all purposes as if fully disclosed herein.

FIELD OF THE INVENTION

The present invention relates generally to system security and, more particularly to, managing access to data by one or more target devices based on a request from a source device.

BACKGROUND

Network connected mobile devices and network applications are in wide use. Connecting an IT environment with mobile devices should involve the consideration of security-related issues. One example of a network application is a printing application that provides a print service and communicates with a printing device. A user might desire to use his/her mobile device to initiate the printing of a document at the printing device. However, problems may arise if the document contains sensitive or confidential information. For example, the user might accidently select the wrong printing device, which might far away from the user's current location. As another example, the user selects the printing device that is closest to the user, but, due to the distance between the user and the printing device, the user does not anticipate the delays that might occur from when the user initiates the printing of the document to when the printed document is available to retrieve at the printing device.

Additionally, when considering security-related issues, IT administrators presume that once target computing devices (such as printing devices) are deployed and operational, such devices are legitimate throughout their lifetime. As a result, when it comes to security-related issues, IT administrators tend focus their attention primarily on source devices that initiate interaction with the target computing devices and on any intermediary devices and services that may be "in the cloud."

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

Techniques are provided for receiving a request from a first device over a network; in response to receiving the request: determining a location of the first device; based on the location of the first device relative to a second device that is different than the first device, determining whether to allow one or more operations to be performed on particular data with respect to the second device; in response to determining, based on the location of the first device relative to the second device, to allow the one or more operations to be performed on the particular data, allowing the one or more operations to be performed on the particular data. Embodiments may be implemented by instructions processed by one or more processors, one or more computer-implemented methods, or devices or apparatuses configured accordingly.

Techniques are also provided for receiving, over a network, a first request for first particular data to be processed by a first device; determining, based on one or more first attributes of the first device, whether to allow one or more operations to be performed on the first particular data with respect to the first device; after allowing the one or more operations to be performed on the first particular data: sending, to the first device, a request for one or more characteristics of the first device; in response to the request, receiving the one or more characteristics from the first device; storing, based on the one or more characteristics, one or more second attributes that are associated with the first device; after storing the one or more second attributes: receiving a second request for second particular data to be processed by the first device; determining, based on the one or more second attributes of the first device, whether to allow one or more second operations to be performed on the second particular data with respect to the first device; determining to not allow the one or more second operations to be performed on the second particular data with respect to the first device, wherein the first device is capable of processing the second particular data.

BRIEF DESCRIPTION OF THE DRAWINGS

In the drawings:

FIG. 3 is a block diagram that depicts a table of user information, according to an embodiment;

FIG. 4 is a block diagram that depicts a table of device information, according to an embodiment;

FIG. 5 is a block diagram that depicts a table of location information, according to an embodiment;

FIGS. 6 and 7 are block diagrams that depict associations between operations, users, locations, device attributes, and specific rules, according to an embodiment;

FIG. 14 is a block diagram that illustrates a computer system upon which an embodiment may be implemented.

DETAILED DESCRIPTION

In the following description, for the purposes of explanation, numerous specific details are set forth in order to provide a thorough understanding of the disclosed embodiments. It will be apparent, however, that the disclosed embodiments may be practiced without these specific details. In other instances, well-known structures and devices are shown in block diagram form in order to avoid unnecessarily obscuring the disclosed embodiments.

General Overview

In an embodiment, a network service allows one or more source devices to initiate one or more operations with respect to one or more target devices. The location of a source device (e.g., a "smartphone") is a factor in determining whether the network service allows the one or more operations to be performed. For example, if the source device and a target device are within the same geographical area, then the one or more operations may be performed. Examples of an operation include sending a list of documents names to be displayed on the source device, sending print data to a printing device to be printed, or causing the printing device to print a document based on print data that already resides on the printing device.

In another embodiment, a network service repeatedly interacts with a target device to determine whether characteristics of the target device satisfy certain criteria. If so, the target device is allowed to perform one or more operations with respect to data that the network service receives. Otherwise, the target device is not allowed to perform the one or more operations, even though the target device is capable of performing the one or more operations. For example, in the printing context, the target device is a printing device, the certain criteria include certain security features, and the one or more operations might include printing a document.

System Overview

Figure 1:
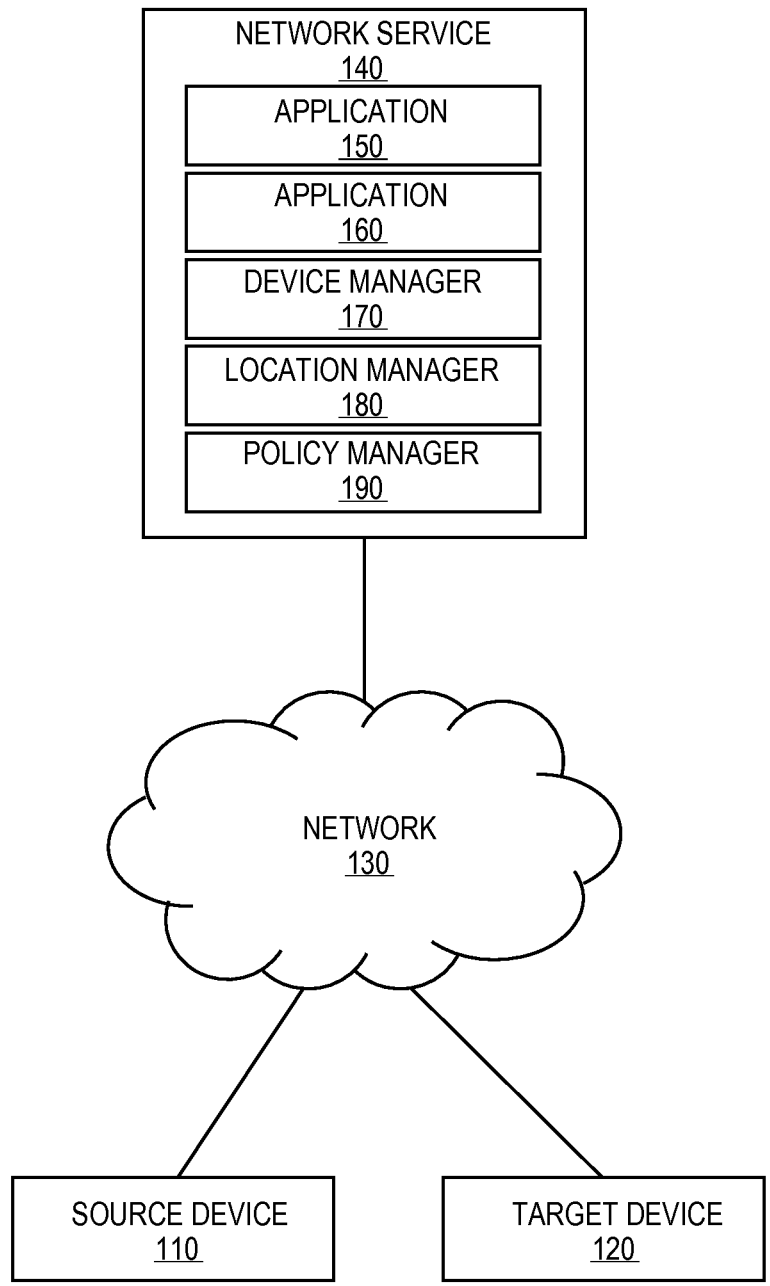
FIG. 1 is a block diagram that depicts a system for managing the use of one or more network resources based on a device location, according to an embodiment.

FIG. 1 is a block diagram that depicts a system 100 for managing the use of one or more network resources based on a device location, according to an embodiment. System 100 includes a source device 110, a target device 120, a network 130, and a network service 140. Network service 140 includes applications 150 and 160, a user device manager 170, a location manager 180, and a policy manager 190. Each of applications 150 and 160, user device manager 170, location manager 180, and policy manager 190 may be implemented in software, hardware, or a combination of software and hardware. Although depicted as separate elements, applications 150 and 160, user device manager 170, location manager 180, and policy manager 190 may be implemented on a single computing device or on two or more computing devices that are communicatively coupled to each other.

Source device 110 is an end-user's computing device, examples of which might include a desktop computer, a laptop computer, a tablet computer, a "smartphone", and a personal digital assistant (PDA). Source device 110 initiates communications with network service 140. Source device 110 is capable of communicating with network service 140 over network 130. For example, source device 110 may include a web browser (not depicted) that is configured to issue HTTP requests and network service 140 may include (or be associated with) a web server (not depicted) that is configured to process and respond to HTTP requests. Although only one source device 110 is depicted in FIG. 1, embodiments might include any number of user devices that communicate with network service 140.

Target device 120 is a computing device that provides a service requested by source device 110. Target device 120 is configured to communicate with network service 140. An example of target device 120 includes a printing device that is configured to cause a printed version of an electronic document reflected in the print data to be printed on a tangible medium. In this example, target device 120 may receive print data from network service 140. The print data may have initially been uploaded to storage that is accessible to network service 140 by source device 110 or by another device (not depicted). Although only one target device 120 is depicted in FIG. 1, embodiments might include any number of target devices that are configured to communicate with network service 140.

Network 130 may be implemented by any medium or mechanism that provides for the exchange of data between source device 110 and network service 140 and between target device 120 and network service 140. Examples of network 130 include, without limitation, a network such as a Local Area Network (LAN), Wide Area Network (WAN), Ethernet or the Internet, or one or more terrestrial, satellite or wireless links.

User Groups and Device Groups

Figure 2:
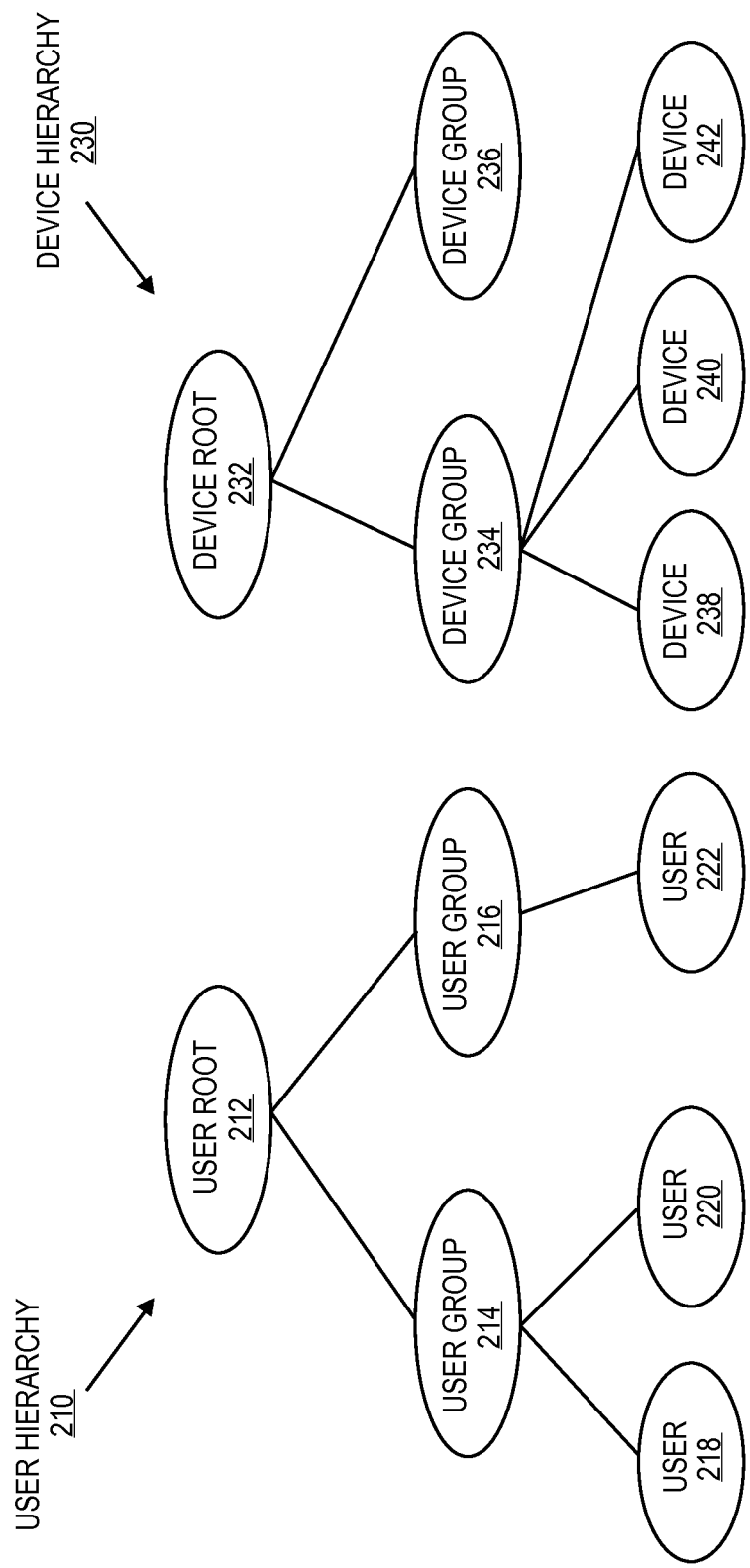
FIG. 2 is a block diagram that depicts hierarchies of users and of devices, according to an embodiment.

FIG. 2 is a block diagram that depicts example hierarchies of users and of devices, according to an embodiment. FIG. 2 depicts a user hierarchy 210 and a group hierarchy 230. User hierarchy 210 includes a user root node 212 that is associated with two user group nodes 214 and 216. User group nodes 214 and 216 are considered "child" nodes of user root node 212. Although only two user group nodes 214 and 216 are depicted, embodiments may include more user group nodes. In this example, user group node 214 is associated with two user nodes 218 and 220 and user group node 216 is associated with user node 222. User nodes 218 and 220 are considered "child" nodes of user group node 214 and user node 222 is considered a "child" node of user group node 216.

A user group node is associated with attributes (e.g., rules, permissions, etc.) that are shared by each child node of that user group node. Such an approach allows an administrator to associate a specific user with a set of attributes without having to specify each attribute in that set. User groups are also helping in rules-based management. For example, a rule may state that a particular user group may access a particular service without the rule having to identify each user that belongs to that particular user group. Instead, for example, a rule manager uses user hierarchy 210 to determine to which group a user belongs and then determines whether one or more rules are associated with that group. Although different child user nodes of a user group node share a set of one or more attributes of the user group node in common, each child user node may be associated with additional attribute(s) that are different relative to additional attribute(s) associated with each other child user node.

Device hierarchy 230 includes a device root node 232 that is associated with two device group nodes 234 and 236. Device group nodes 234 and 236 are considered "child" nodes of device root node 232. Although only two device group nodes 234 and 236 are depicted, embodiments may include more device group nodes. In this example, device group node 234 is associated with three device nodes 238, 240, and 242 and device group node 236 is not associated with any device node.

Device hierarchy 230 is similar to user hierarchy 210 in that a device group node is associated with attributes (e.g., rules, permissions, etc.) that are shared by each child node of that device group node. Such an approach allows an administrator to associate a specific device with a set of attributes without having to specify each attribute in that set. Device groups are also helping in rules-based management. For example, a rule may state that a particular device group may receive certain information from a network service without the rule having to identify each device that belongs to that particular device group. Instead, for example, a rule manager uses device hierarchy 230 to determine to which group a device belongs and then determines whether one or more rules are associated with that group. Although different child device nodes of a device group node share a set of one or more attributes of the device group node in common, each child device node may be associated with additional attribute(s) that are different relative to additional attribute(s) associated with each other child device node.

User Information

FIG. 3 is a block diagram that depicts a table 300 of user information, according to an embodiment. Table 300 includes three fields or columns: an ID field, a Name field, and a Password field. The identifiers in the ID field are unique user identifiers. The names in the Name field include names (whether first name, last name, or full name) of the users associated with the user IDs. Each password in the Password field may be established by the corresponding user or by a network service that manages table 300. In this example, information about only three users is included in table 300; although information about more users may be included. Embodiments are not limited to how the user information is stored. For example, instead of a table, such user information may be stored in a linked-list, a set of objects, or a multi-dimensional array.

Device Information

FIG. 4 is a block diagram that depicts a table 400 of device information, according to an embodiment. The devices identified in table 400 may include both user devices (e.g., source device 110) and target devices (e.g., target device 120). Table 400 includes four fields or columns: an ID field, a Name field, a Location field, a Mobile field, and a Certified field. The identifiers in the ID field are unique device identifiers. The names in the Name field include names of the devices associated with the device IDs. Each name in the Name field may or may not be unique relative to other names in the Name field.

Each location in the Location field indicates a location identifier that is associated with a geographical location of the corresponding device. Alternatively, the Location field may include actual geographical data, such as longitude and latitude coordinates. If a corresponding device is considered a mobile device (e.g., a laptop computer, a tablet computer, or a smartphone), then the Location field for that device indicates "mobile."

The Mobile field indicates whether a device is mobile device, such as a laptop computer, a tablet computer, or a smartphone. If a device is considered a mobile device, then the corresponding Mobile field indicates "TRUE." If a device is not considered a mobile device, such as a desktop computer or a printing device, then the corresponding Mobile field indicates "FALSE."

The Certified field indicates whether a device has been certified, for example, by network service 140. Characteristics of a device may have to satisfy one or more criteria in order to be certified. For example, a device may be required to have installed certain hardware, firmware, and/or software in order to be certified.

Also, different types of devices may require a different set of characteristics in order to be considered certified. For example, source devices (e.g., source device 110) may need to have certain security features in order to be "certified" by network service 140, while target devices (e.g., target device 120) may need to have a certain firmware version installed and store a unique authorization code that indicates that the latest firmware update is valid in order to be certified by network service 140. Thus, the security features that a source device must have in order to be certified are irrelevant to target device 120 and the firmware version and authorization code are irrelevant to source device 110.

In a related embodiment, a device may be associated with one of many different levels of security or certification. For example, device1 may be certified at "Level1", device2 may be certified at "Level3" and so forth. In this embodiment, each level of security or certification is associated with a different set of (e.g., security) features or attributes of a device. Furthermore, each succeeding level may or may not be a superset of a preceding level.

Alternatively, instead of a single table that stores information about both user devices (e.g., source device 110) and target devices (e.g., target device 120), different tables may be used: one for user devices and one for target devices.

Embodiments are not limited to how the device information is stored. For example, instead of a table, such device information may be stored in a linked-list, a set of objects, or a multi-dimensional array.

Location Information

FIG. 5 is a block diagram that depicts a table 500 of location information, according to an embodiment. Table 500 includes two fields or columns: a Location ID field and a Range definition field. Each location identifier in the Location ID field is associated with a range definition that defines a geographical region. Some range definitions rely on specific geographical coordinates, while other range definitions rely on labels, operators, and/or Boolean logic. For example, the second and third range definitions in table 500 involve latitude and longitude coordinates. The second range definition is illustrative: the location associated with "US/NY/office01" is associated with range definition "AROUND ('42.98053954751642', '−75.56396484375', 30)." The first two numbers specify a specific geographical location, while the AROUND operator and the operand '30' indicates that the corresponding location identifier is associated with a geographical region of 30 meters (or another unit of length) around the specified geographical location.

The first range definition (i.e., associated with location ID of "US/NY") is IN_RANGE("NEW_YORK_STATE"). The label "NEW_YORK_STATE" may be associated with a specific geographic boundary (not depicted). The operator "IN_RANGE" indicates that a device is in the location "US/NY" if the device is in range of (or within) the geographical boundaries associated with "NEW_YORK_STATE."

The fourth range definition includes a Boolean operator (&&) and references to previous range definitions: namely, the first, second, and third range definitions in table 500. The references are labeled "LOCATION1", "LOCATION2", and "LOCATION3." Therefore, another way to read the fourth range definition is that the geographical region associated with "US/NY/public" is within "NEW_YORK_STATE" but outside of the second and third regions.

The fifth range definition includes another operator ("OUT_RANGE") and a reference to an earlier-defined range as an operand. The reference in this example is "LOCATION1", which refers to the first range definition.

Embodiments are not limited to how location information is stored. For example, instead of a table, such location information may be stored in a linked-list, a set of objects, or a multi-dimensional array.

Rule-Based Management

FIGS. 6 and 7 are block diagrams that depict example associations between operations, users, locations, device attributes, and specific rules, according to an embodiment. A "rule" is an association between a set of one or more conditions and a set of one or more actions. The set of one or more actions of a rule are performed only after all conditions in the corresponding set of one or more conditions are satisfied. Thus, for example, in table 600, the action of the (first) rule associated with Rule ID "App1_login_rule_ok" is performed only after (1) the operation "login( )" supported by (2) application "Application1" is requested, the user that requested the operation is (3) from Group1, and the user's device is (4) in either location US/NY/office1 or US/NY/office2. Other rules may have more or less conditions that must be satisfied in order for the associated actions to be performed.

Alternatively, a rule may be associated with multiple conditions where only one condition (or a strict subset of the conditions) must be satisfied in order to trigger performance of the associated action(s).

Table 600 depicted in FIG. 6 includes eight fields or columns: an Application field, an Operation field, a User/Group field, an Operation Device Location field, an Operation Device Attribute field, a Related Device Location field, a Related Device Attribute field, and a Rule ID field. In some embodiments, table 600 includes additional fields. In other embodiments, table 600 includes fewer fields. For example, if network service 140 only provides a single application or if rules are relevant to only a single application hosted by network service 140, then the Application field is optional. As another example, if the location of a user's device is not relevant or important for any rule, then the Operation Device Location field is optional. As another example, if no rule requires a user's device to be certified or otherwise satisfy certain criteria, then the Operation Device Attribute field is optional.

The Operation field of table 600 includes names of operations that may be performed by the corresponding application. For example, rules are associated with the following three operations supported by Application1: login( ) listDocument( ), and print( ) Other rules are associated with the following two operations supported by Application2: operation1( ) and operation2( ). Application1 and Application2 may support other operations with which no rules are associated.

Some rules are limited to certain users or groups of users. The User/Group field specifies a particular user or user group for a given set of one or more rules. However, for some rules, a specific user or groups is irrelevant. For such rules, the User/Group field specifies the all-inclusive "ANY".

The Operation Device Location field indicates a label for a geographical region. The labels in the Operation Device Location field correspond to the location identifiers in the Location ID field of table 500. Alternatively, the range definitions in the Range definition fields may be specified in the Operation Device Location field of table 600. In such an embodiment, table 500 (or another data structure that contains location information) might not be required.

In an embodiment, instead of a single table 600, the information contained in table 600 is partitioned or divided into multiple tables (or other storage objects). For example, given the information in table 600, two tables may be created, one for each application (i.e., Application1 and Application2). In those tables, an Application field is not necessary. As another example, a different table is created for each operation. Thus, given the information in table 600, five tables may be created in this example: one for each of login( ), listDocument( ), print( ), operation1( ), and operation2( ).

Table 700 depicted in FIG. 7 includes two fields or columns: a Rule ID field and a Rule field. The Rule ID field of FIG. 7 corresponds to the Rule ID field of FIG. 6. Each rule indicates a set of one or more actions that application 150 (or 160) is to perform. For example, the first rule in table 700 indicates one action or operation: "Verify user name and password." A rule in table 700 may additionally specify a condition that must be satisfied in order for a corresponding action to be performed. For example, the eighth rule in table 700 indicates that the action is "Show the error message" if the level of a target document is level1 and that if the level of the target document is not level1, then the action "Print the document to the printer" is performed.

In an embodiment, tables 600 and 700 are combined such that table 600 includes the Rule field of table 700. In this embodiment, the Rule ID field becomes unnecessary and may be excluded in such a combined table.

Embodiments are not limited to how rule information is stored. For example, instead of one or more tables, such rule information may be stored in a linked-list, a set of non-relational objects, or a multi-dimensional array.

Print Screens

Figure 8:
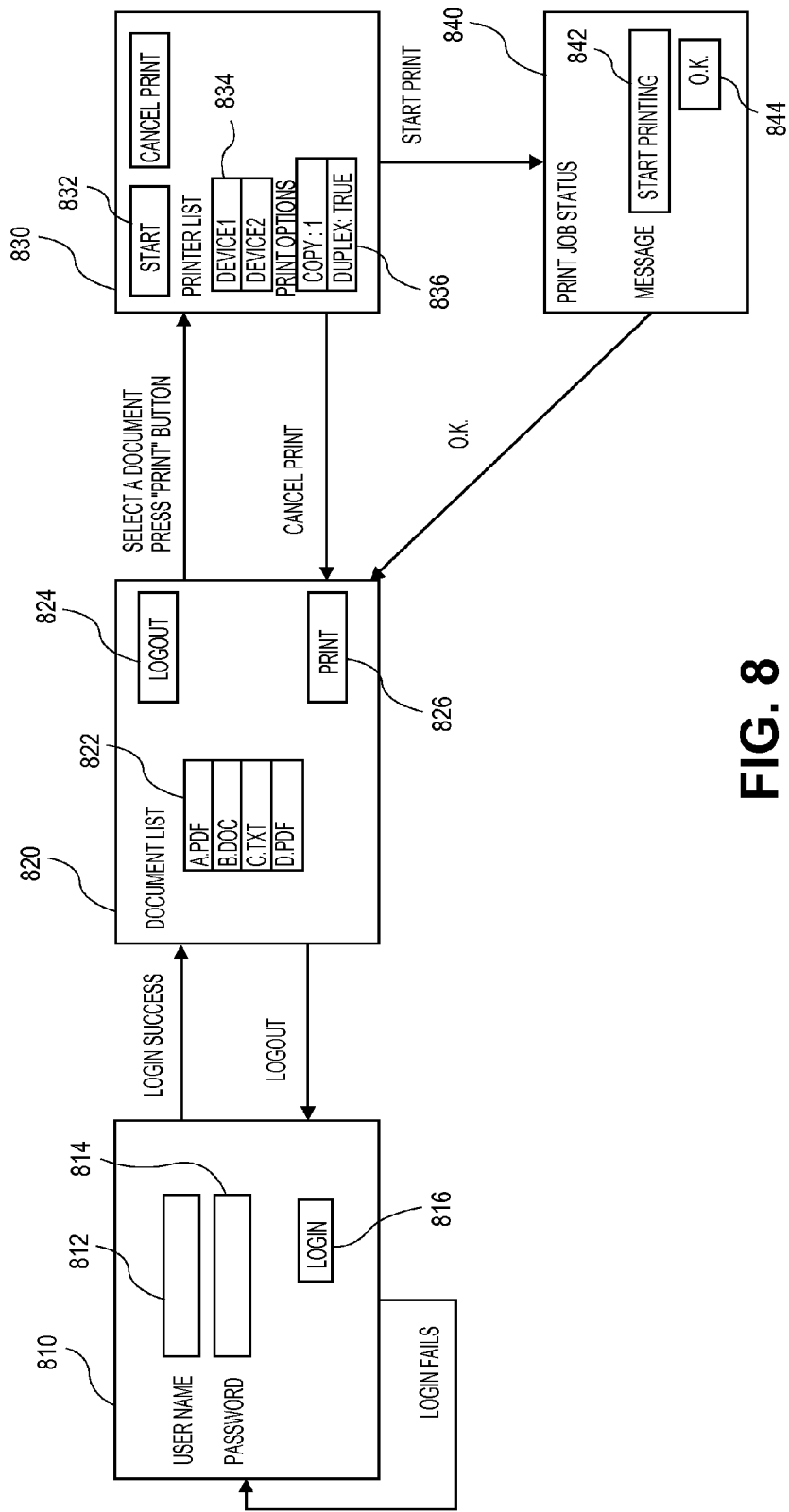
FIG. 8 is a flow diagram that depicts screens associated with a print operation, according to an embodiment.

FIG. 8 is a flow diagram that depicts example screens 810-840 associated with a print request, according to an embodiment. The print request comprises multiple operations. The print request is initiated by a user of source device 110. For example, a user of source device 110 provides input, such as entering a URL or selecting an icon that is displayed on a display of source device 110 and that is associated with network service 140. In response to receiving the input, source device 110 sends a request, over network 130, to network service 140. The request may be a HTTP request that is processed by application 150 (or another process provided by network service 140).

In response to receiving the request, network service 140 (or, specifically, application 150), send a login screen 810 to source device 110. Login screen 810 includes two input fields: a User Name input field 812 and a Password input field 814. Login screen 810 also includes a Login button 816. The user of source device 110 provides, into fields 812 and 814, input that includes a user name and a password and then selects Login button 816. The input may be, for example, voice input or selecting keys on a physical keyboard or keys on a graphical keyboard. Embodiments are not limited to the form or the type of the input.

In response to receiving an indication that the user of source device 110 selected Login button 816 (which indication may be another HTTP request that includes user name and password data), network service 140 determines whether the user name and password are correct, for example, by checking table 300.

If table 300 does not contain a row that includes both the user name and password received from source device 110 (or network service 140 otherwise determines that one or both of the user name and password was invalid or incorrect), then network service 140 might re-send Login screen 810 with blank input fields 812 and 814. Additionally or alternatively, Login screen 810 might include an error message that indicates that one or both of the user name and password was incorrect. If table 300 contains a row that includes both the user name and password received from source device 110 (or network service 140 otherwise determines that the combination of the user name and password is valid or correct), then network service 140 sends a Document List screen 820 to source device 110. Document List screen 820 includes a list of document names 822, a Logout button 824, and a Print button 826.

Source device 110 receives Document List screen 820 and displays Document List screen 820 on a display of source device 110. The user of source device 110 selects a name from among the list of document names 822. (Alternatively, one of the document names may be selected by default, or "preselected," such that the user is not required to provide any input to select the document name.) Before or after selecting a name, the user might select Logout button 824, which causes Login screen 810 to be re-displayed at source device 110. Alternatively, after selecting a name (e.g., "A.pdf"), the user might select Print button 826. Selection of Print button 826 causes source device 110 to generate and send another request to network service 140. The request includes document identification data that network service 140 uses to identify the user-selected document name (e.g., "A.doc").

In response to receiving the request, network service 140 sends a Print Options screen 830 to source device 110. Print Options screen 830 includes a Start button 832, a Printer List 834, a Print Options list 836, and a Cancel Print button 838. Printer List 834 includes names of one or more printing devices, one of which may be target device 120. Print Options list 836 includes a list of one or more print options. In this example, Print Options list 836 indicates a number of printed copies that may be requested to be produced and whether duplex is requested. In other embodiments, Print Options list 836 may include numerous other print options that are not depicted.

Some print options listed in list 836 may be selected by default (or "pre-selected"). Similarly, one of the names listed in Printer List 834 may be selected by default. Once the user is satisfied with the selected printer and print options, the user selects Start button 832. Selection of Start button 832 causes source device 110 to send another request to network service 140. The request includes printer identification data that network service 140 uses to identify the selected printer (e.g., "Device1") and options identification data that network service 140 uses to identify the selected print options.

In response to receiving the request, network service 140 sends, to target device 120 (i.e., that correspond to the selected printer), a start print command along with the selected print options (whether user-selected or default). Also, network service 140 sends, to source device 110, a Print Job Status screen 840 that includes a message about the status of the print operation. Print Job Status screen 840 includes a message field 842 and an OK button 844. Message field 842 might dynamically change while Print Job Status screen 840 is displayed on a display of source device 110. For example, initially, message field 842 might indicate "Start printing" and then, later, indicate "Printing finished" or "Error at printer."

Selection of OK button 844 causes source device 110 to send a message to network service 140, which, in response, sends Document List screen 820 to source device 110. This version of Document List screen 820 may be different than the prior version of Document List screen 820 displayed by source device 110. For example, if document "A.pdf" was selected by a user to print, then the subsequent version of Document List screen 820 might not list "A.pdf."

Login Sequence

Figure 9:
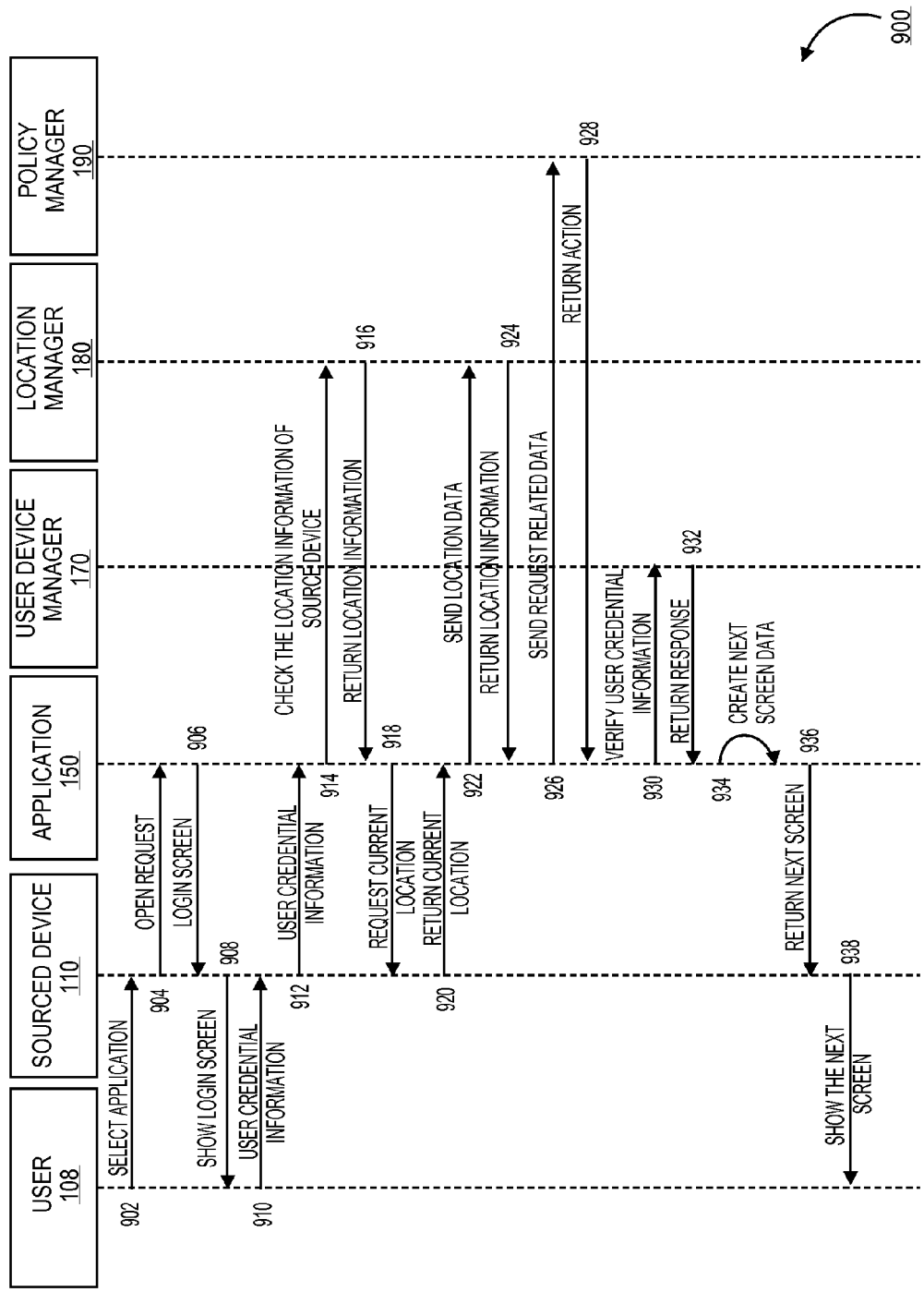
FIG. 9 is a sequence diagram that depicts a login sequence that involves rules that depend on a device location and/or device attribute(s), according to an embodiment.

FIG. 9 is a sequence diagram that depicts an example login sequence 900 that involves rules that depend on a device location and/or device attribute(s), according to an embodiment. At step 902, a user of source device 110 provides input that indicates a selection of application 150. At step 904, in response, source device 110 sends, over network 130, an open application request to application 150. At step 906, in response, application 150 sends a login screen (e.g., Login screen 810) to source device 110. At step 908, source device 110 displays the login screen.

At step 910, the user of source device 110 provides (e.g., enters), to source device 110, input that includes the credential information, such as a user name and password. At step 912, in response, source device 110 sends the credential information to application 150. At step 914, application 150 sends, to location manager 180, device identification data that identifies source device 110, such as an IP address, MAC address, or a portion of the credential information. At step 916, in response, location manager 180 sends, to application 150, location data that indicates a location of source device 110. If network service 140 considers source device 110 as "mobile," then the location data might indicate "mobile."

At step 918, application 150 sends, to source device 110, a request for the current location of source device 110 if, for example, the location data from location manager 180 indicates that source device 110 is mobile. At step 920, in response, source device 110 sends location data to application 150. The location data indicates a current location of source device 110. The location data may be geographical coordinates or some other location information, such as the name of an actual location or area (e.g., Disneyland or Georgia). Embodiments are not limited to how source device 110 determines its location or the format of the location data. Examples of methods for a device in determining its current location include GPS (Global Positioning System), aGPS (which relies not only on satellites as in GPS but also on Global System for Mobile Communications (GSM) towers), GSM localization (which relies on GSM towers), and using WiFi (which is typically helpful in urban areas) to identify hotspots with known locations.

At step 922, in response, application 150 sends the location data to location manager 180. At step 924, in response, location manager 180 determines, for example based on table 500, a location identifier for source device 110 and sends the location identifier to application 150.

At step 926, in response, application 150 sends, to policy manager 190, a message that indicates an application identifier that is associated with application 150 (e.g., "Application1"), an operation identifier that is associated with the requested operation (e.g., "login( )"), the location identifier (e.g., "US/NY/office1"), and an attribute identifier that indicates whether source device 110 is certified or otherwise satisfies certain criteria (e.g., "certified").

At step 928, in response, policy manager 190 identifies, for example based on tables 600 and 700, a rule that is associated with the identifiers provided by application 150 and sends, to application 150, one or more actions associated with the rule. For example, the identified rule may be rule ID "app1_login_rule_ok" in table 600 and the corresponding action may be "Verify user name and password." In the depicted example, at step 930, application 150 sends the user credential information (i.e., user name and password) to user device manager 170.

The combination of the current location of source device 110 and the location of target device 120 may map to a different rule such that, for example, network service 140 does not allow the one or more requested operations to be performed. For example, such operations may be displaying a list of document names at source device 110, sending particular data to target device 120, or causing target device 120 to perform an operation, such as printing a particular document. However, if source device 110 is moved to a different location such that both source device 110 and target device 120 are in the same specified region or geographic location, then a different rule is identified and network service 140 allows the requested one or more operations to be performed.

At step 932, in response, user device manager 170 sends, to application 150, a response message that indicates whether the user credential information is valid. If the response message indicates that the user credential information is valid, then, at step 934, application 150 creates a next screen and sends, at step 936, the next screen to source device 110. An example of the next screen is Document List screen 820. At step 938, source device 110 causes the next screen to be displayed to the user of source device 110.

Print Sequence

Figure 10:
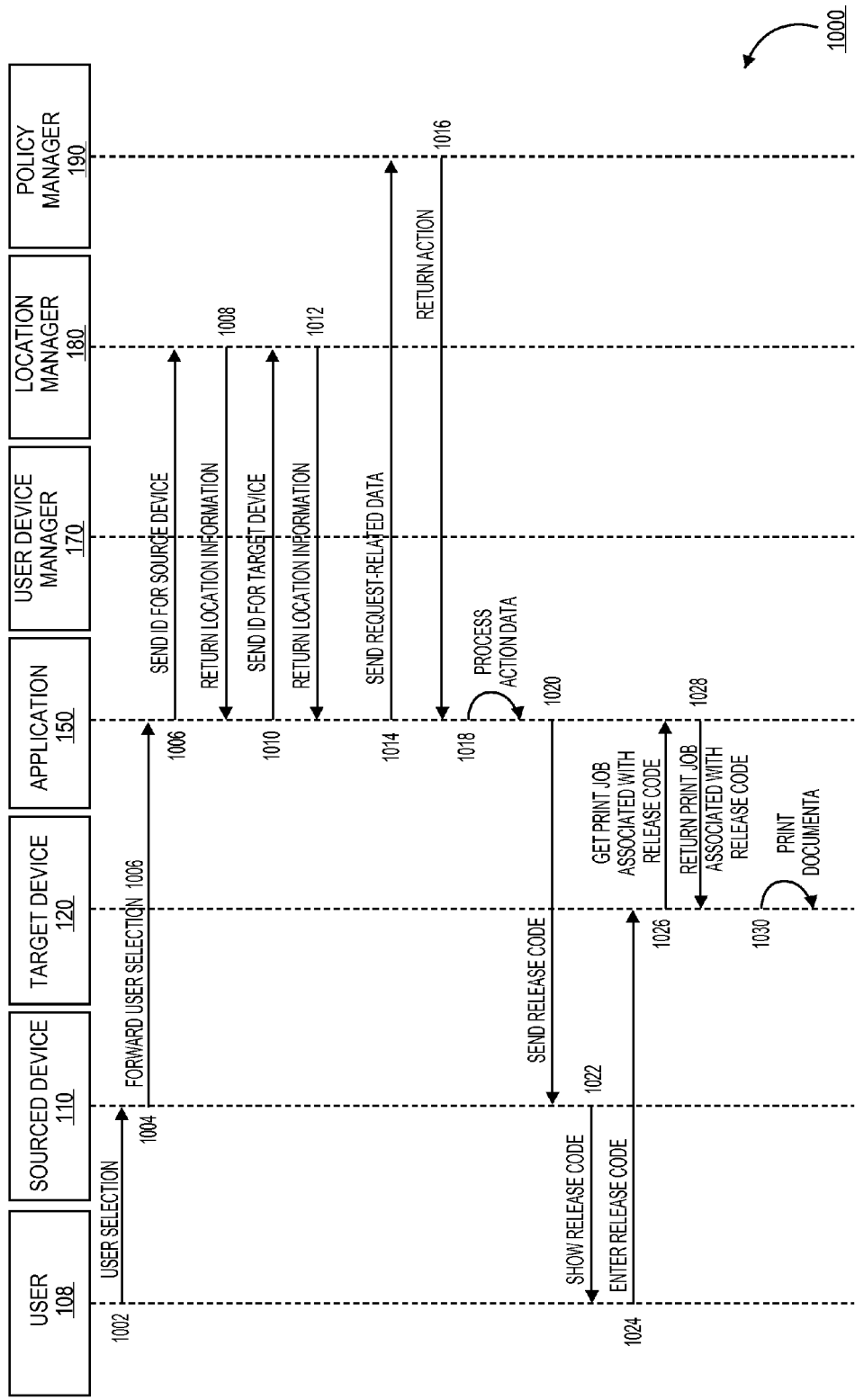
FIG. 10 is a sequence diagram that depicts a print sequence that involves rules that depend on a device location and/or device attribute(s), according to an embodiment.

FIG. 10 is a sequence diagram that depicts an example print sequence 1000 that involves rules that depend on a device location and/or one or more device attributes, according to an embodiment. Examples of device attributes include whether a device is certified and/or whether a device has certain security features. Print sequence 1000 may begin immediately after login sequence 900 is completed. For example, as noted above, the next screen sent by application 150 may be Document List screen 820 described earlier.

At step 1002, a user of source device 110 selects a document name and a printer name. At step 1004, in response, source device 110 sends the document name and printer name (or identifiers that are mapped to the respective names), to application 150.

At step 1006, in response, application 150 sends an identifier for source device 110 to location manager 180. At step 1008, in response, location manager 180 identifies a location of source device 110 and sends, to application 150, location data that indicates a geographic region (for example, that is defined by a range definition). For example, location manager 180 may communicate with source device 110 to determine its geographical location and compares the geographical location with range definitions in table 500. As another example, the location of source device 110 may be cached based on a previous determination during login sequence 900 and, thus, further communication with source device 110 to determine its current location may be unnecessary. (FIG. 12 and the corresponding description contain more details on determining a location of source device 110.)

At step 1010 (which may be part of step 1006), application 150 sends an identifier for target device 120 (which corresponds to the selected document name in step 1002) to location manager 180. At step 1012 (which may be part of step 1008), location manager 180 identifies a location of target device 120 (for example, by looking up the appropriate row in the Location field of table 400) and sends, to application 150, location data that indicates a geographic region (for example, that is defined by a range definition).

At step 1014, application 150 sends, to policy manager 190, a message that indicates an application identifier that is associated with application 150 (e.g., "Application1"), an operation identifier that is associated with the requested operation (e.g., "print( )"), a location identifier that is associated with source device 110 (e.g., "US/NY/office1"), a location identifier that is associated with target device 120 (e.g., "US/NY/office1"), and an attribute identifier that indicates whether source device 110 is certified or otherwise satisfies certain criteria (e.g., "certified"), and an attribute identifier that indicates whether target device 120 is certified or otherwise satisfies certain criteria (e.g., "certified").

At step 1016, in response, policy manager 190, identifies, for example based on tables 600 and 700, a rule that is associated with the identifiers provided by application 150 and sends, to application 150, one or more actions associated with the rule. For example, the identified rule may be rule ID "app1_print_at_office_confidential" in table 600 and the corresponding actions may be, according to table 700 and based on the fact that the selected document is associated with level1, "Put watermark on the target document image; Return the release code of print job; Email this job record to Administrator."

At step 1018, in response, application 150 processes the action data received from policy manager 190. For example, application 150 might generate a release code and associate the release code with the electronic document identified by the user-selected document name. The release code may be a unique alphanumeric sequence. Embodiments are not limited to the form or nature of the release code.

At step 1020, application 150 sends the release code to source device 110. At step 1022, in response, source device 110 displays the release code to the user of source device 110.

At step 1024, the user of source device 110 (or another user) enters the release code into target device 120, for example, by selecting physical or graphical keys or by voice input.

Figure 11:
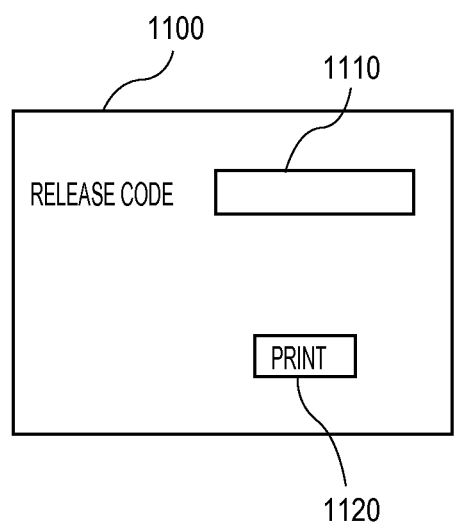
FIG. 11 is a block diagram that depicts a screen that accepts a release code, according to an embodiment.

FIG. 11 is a block diagram that depicts an example release code screen 1100 that is used to accept a release code, according to an embodiment. Release code screen 1100 includes a Release Code input field 1110 and a Print button 1120. After a user enters a release code into Release Code input field 1110, the user selects Print button 1120, which causes target device 120 to send the release code to application 150. This sending corresponds to step 1026 of FIG. 10.

Returning to FIG. 10, at step 1026, in response to receiving the input that indicates the release code, target device 120 sends, to application 150, a request to retrieve an electronic document to print, where the request includes the release code provided by the user in step 1024.

At step 1028, in response, application 150 identifies the electronic document that is associated with the release code and sends, to target device 120, a print job that includes the electronic document. The print job may include print features that were selected by the user, such as color, orientation, duplex, number of copies, etc.

At step 1030, target device 120 receives the print job and generates one or more printed documents based on the electronic document and any print features indicated in the print job.

Determining a Location of a Source Device

Figure 12:
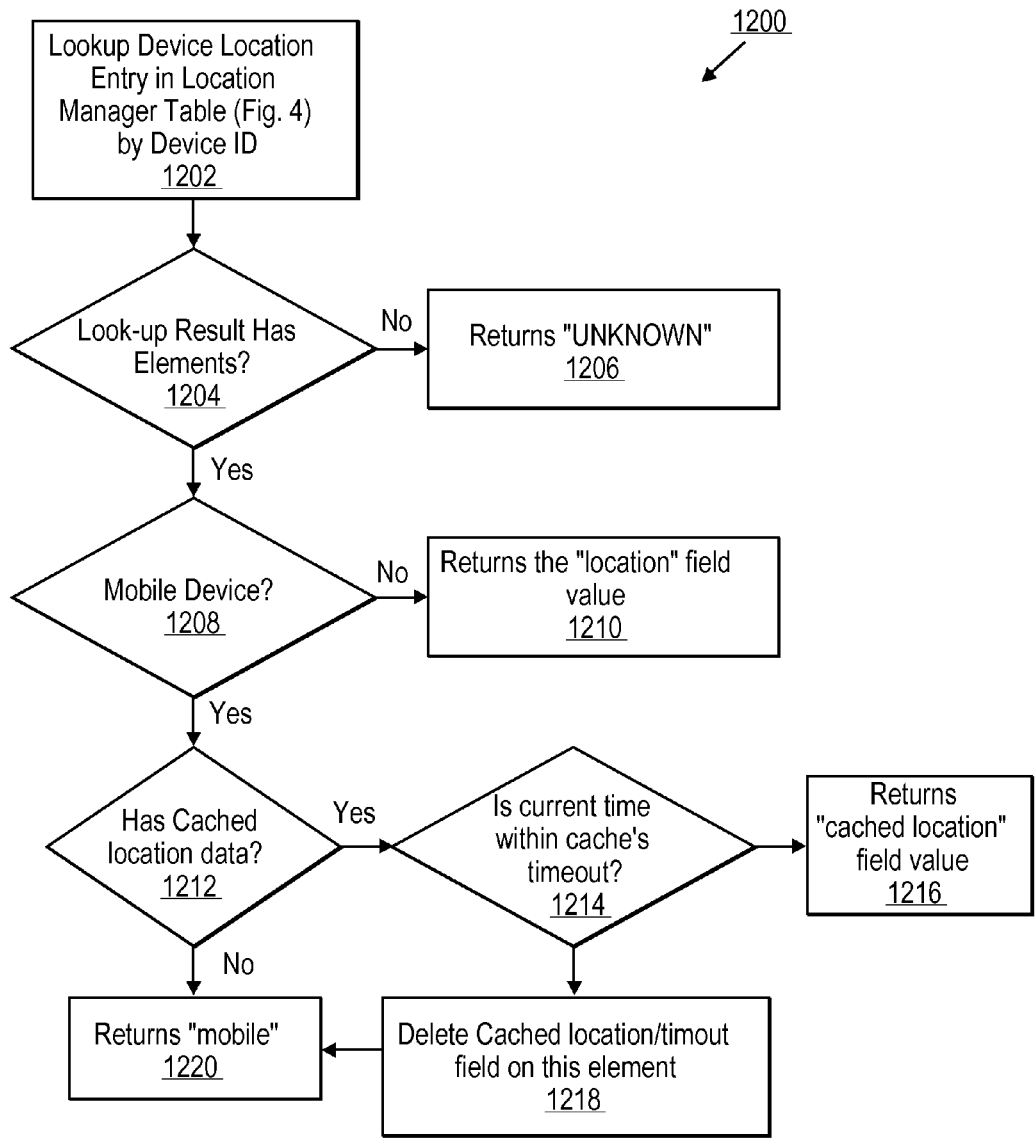
FIG. 12 is a flow diagram that depicts a process for determining a location of a device, according to an embodiment.

FIG. 12 is a flow diagram that depicts an example process 1200 for determining a location of a device, according to an embodiment. Although process 1200 is described as being performed by location manager 180, another processing entity of network service 140 or a combination of location manager 180 and another processing entity (e.g., application 150) may perform different steps of process 1200.

At step 1202, location manager 180 uses a device identifier (e.g., provided by application 150) to look up the corresponding location in table 400. Location manager 180 may not know whether the device identifier is for an end-user's device (e.g., source device 110) or for a target device (e.g., target device 120). Instead, location manager 180 merely looks up and returns a location value associated with the device identifier.

At step 1204, location manager 180 determines whether any location was identified in step 1202. If not, then process 1200 proceeds to step 1206, where location manager 150 provides a response (e.g., to application 150) that indicates that the location of the device that corresponds to the device identifier is unknown. Otherwise, process 1200 proceeds to step 1208.

At step 1208, location manager 180 determines whether the device that corresponds to the device identifier is "mobile." If not, then, at step 1210, location manager 180 returns the value of the Location field of table 400. Otherwise, process 1200 proceeds to step 1212.

At step 1212, location manager 180 determines whether location data of the device (i.e., that corresponds to the device identifier) is cached. The exact storage location of cached location data is not critical. For example, for a device that is considered mobile, location data for the device may be in the Location field of table 400. Regardless, if the location data of the "mobile" device is cached, then process 1200 proceeds to step 1214. Otherwise, process 1200 proceeds to step 1220.

At step 1214, location manager 180 determines whether the current time is within a timeout period associated with the cached location data. For example, location data of a mobile device may be cached for a limited period of time, such as five minutes. If the current time is within the timeout period, then, at step 1216, location manager 180 returns the cached location data and process 1200 ends. Else, at step 1218, location manager 180 deletes the cached location data associated with the device identifier.

At step 1220, location manager 180 returns (e.g., to application 150) data that indicates that the device is "mobile." The entity that receives such data (e.g., application 150) may then, in response, request the current location of the device from the device.

Identifying a Rule

Figure 13:
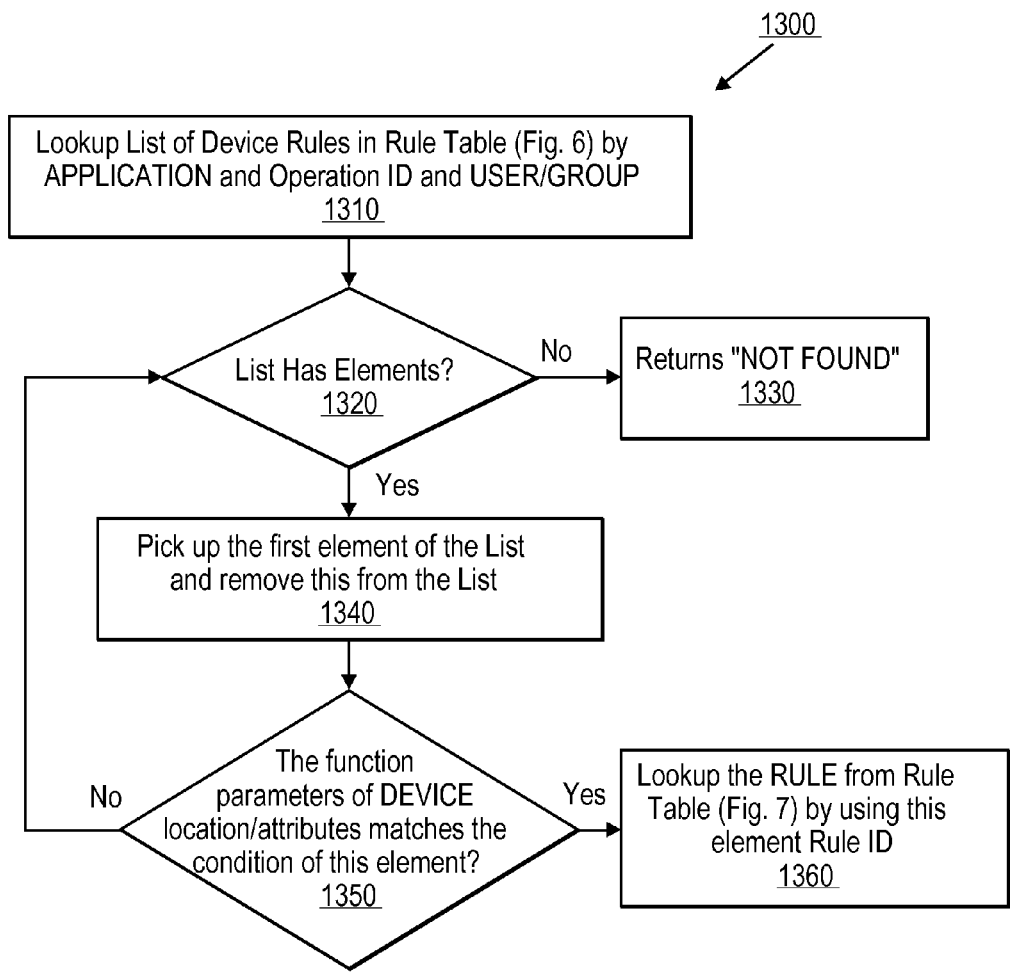
FIG. 13 is a flow diagram that depicts a process for identifying a rule, according to an embodiment.

FIG. 13 is a flow diagram that depicts an example process 1300 for identifying a rule, according to an embodiment. Although the following describes policy manager 190 as performing process 1300, another processing entity of network service 140 or a combination of policy manager 190 and another processing entity (e.g., application 150) may perform different steps of process 1300.

At step 1310, policy manager 190 identifies a list of one or more rules from table 600 based on one or more rule selection criteria, such as an application identifier, an operation identifier, and a user/group identifier. For example, an application identifier may be "Application1", an operation identifier may be "print( )", and a user/group identifier may be "user1" or "group1."

At step 1320, policy manager 190 determines whether the list is empty. If so, then, at step 1330, policy manager 190 returns (e.g., to application 150) a message that indicates that no rules that satisfy the one or more criteria were found. Otherwise, process 1300 proceeds to step 1340.

At step 1340, policy manager 190 identifies the next (e.g., first) rule in the list. At step 1350, policy manager 190 determines whether additional condition(s) of the identified rule are satisfied based on additional criteria. For example, additional criteria might include a current location of source device 110 and/or a current location of target device 120.

Additionally or alternatively, additionally criteria might include whether source device 110 is "certified" and/or whether target device 120 is "certified." If policy manager determines that additional condition(s) of the identified rule are satisfied based on additional criteria, then, at step 1360, policy manager 190 uses the rule ID of the identified rule to identify the corresponding action(s) in table 700. Otherwise, process 1300 returns to step 1320.

In an alternative embodiment, instead of identifying a list of one or more rules in step 1310 using only some (but not all) of the rule selection criteria, step 1310 comprises using all of the rule selection criteria (e.g., including the current location of source device 110 and/or target device 120 and whether source device 110 and/or target device 120 are "certified"). In this way, steps 1340 and 1350 are unnecessary.

Recertifying a Device

After deployment, a target device, such as a printing device, may be compromised or "hacked" by unscrupulous third parties. Such a compromise might allow a third party to access confidential (or otherwise sensitive) electronic data that network service 140 sends to the target device for processing (e.g., printing). Therefore, even though target device 120 might not be compromised initially, there is a possibility that target device 120 might be compromised eventually. Thus, data that network service 140 maintains and that indicates the status of a target device as "certified" (e.g., in table 400) might be incorrect, along with any rules that rely on the certification status of the target device.

Accordingly, in an embodiment, target device 120 and, optionally, one or more other target devices (not depicted in FIG. 1) are recertified. Recertification involves network service 140 (or a "certification server" that may be part of or separate from network service 140) determining whether target device 120 satisfies one or more certification criteria. An example of a certification criterion is the existence of certain software or firmware installed on target device 120. Another example of a certification criterion is whether target device 120 stores a particular authorization code that may be associated with a recent firmware or software update. Another example of a certification criterion is whether a storage device of target device 120 is configured to overwrite electronic data immediately or soon after target device 120 processes the electronic data (e.g., prints a document based on the electronic data).

Thus, the one or more certification criteria may change from one time to another, especially if, for example, a different authorization code is stored on target device 120 whenever a firmware or software update on target device 120 is performed.

In an embodiment, recertification may be performed on a regular or periodic basis and/or in response to an event. For example, network service 140 (or a certification server) determines whether target device 120 satisfies one or more certification criteria at 1 AM every day. As another example, network service 140 determines whether target device 120 satisfies one or more certification criteria immediately after detecting that target device 120 has installed a software or firmware update. If network service 140 determines that target device 120 satisfies the one or more certification criteria, then network service 140 stores classification data that classifies target device 120 as certified. Otherwise, network service 140 stores classification data that classifies target device 120 as not certified.

If one or more characteristics of target device 120 do not satisfy the one or more certification criteria, then that information may be used to prevent certain operation(s) to be performed, even though target device 120 is capable of performing the operation(s). For example, if a user of source device 110 wishes to print a particular document at target device 120, but target device 120 is not certified (or its characteristics do not satisfy the one or more certification criteria), then network service 140 prevents target device 120 from printing the document, even while target device 120 is fully operational (e.g., and includes enough paper and toner or ink cartridges, etc.). Preventing may be enabled by network service 140 not sending the necessary print data to target device 120 or, if target device 120 already stores the print data, by not sending, to target device, instruction data that instructs target device 120 to print the document.

The communication between target device 120 and network service 140 may be enabled, at least in part, by specific software executing on target device 120. The software may be developed by a party that owns and/or developed network service 140. The software may be part of the same software package that enables target device 120 to communicate with network service 140 regarding, for example, a print job. The software may be configured to identify one or more certain characteristics of target device 120, characteristic(s) that network service 140 uses to determine whether target device 120 is certified.

In an embodiment, network service 140 "recertifies" source device 110 and, optionally, one or more other source devices (not depicted in FIG. 1). Similarly, recertification involves network service 140 determining whether source device 110 satisfies one or more certification criteria. Examples of certification criteria include whether source device 110 has a storage device, whether source device 110 has a storage device that encrypts data stored therein, whether source device 110 has a storage device has an overwriting feature where certain data is overwritten immediately or soon after a particular event occurs, whether source device 110 has a screen capture feature, and whether source device 110 has a screen watermark feature.

In the context of source devices, recertification may be performed on a periodic basis (e.g., every 10 days) or in response to certain events, such as whenever source device 110 requests a service provided by network service 140. For example, in response to receiving a login request from source device 110 (or any request that is associated with a rule that requires source device 110 to be certified), network service 140 sends a request to source device 110 to obtain certain information about source device 110 in order to determine whether one or more certification criteria are satisfied. If network service 140 determines that source device 110 satisfies the one or more certification criteria, then network service 140 stores classification data that classifies source device 110 as certified. Otherwise, network service 140 stores classification data that classifies source device 110 as not certified.

The communication between source device 110 and network service 140 may be enabled, at least in part, by specific software executing on source device 110. The software may be developed by a party that owns and/or developed network service 140. The software may be configured to identify one or more certain characteristics of source device 110, characteristic(s) that network service 140 uses to determine whether source device 110 is certified.

Certifying a Device on a Per-Request Basis

Additionally or alternatively to recertifying target device 120 such that a target device 120 as certified with respect to all requests while target device 120 is classified as certified, network service 140 determines whether to send certain data to target device 120 on a per-request basis. Network service 140 compares one or more attributes associated with a request from source device 110 to one or more attributes of target device 120 to determine whether to send, to target device 120, data that is requested in the request. For example, for a first request to process a first print job, network service 140 identifies one or more attributes of a first electronic document that corresponds to the first print job and determines, based on the one or more attributes, whether to send the first print job to target device 120. For a second request to process a second print job, network service 140 identifies one or more second attributes of a second electronic document that corresponds to the second print job and determines, based on the one or more attributes of the second electronic document, whether to send the second print job to target device 120.

Some attributes may include security-related features such as a watermark. For example, an electronic document might include a "watermark" that must be printed and, thus, any printing devices that are not capable of printing watermarks will not be sent that electronic document for printing. As another example, a printing device that can print in color may be needed in order to support a security-related feature in an electronic document. As another example, a printing device may need a specific type of toner in order print a document that includes, for example, a barcode, which may or may not be considered a security-related feature. In other words, a target printing device cannot be used if the target printing device does not include the specific type of toner. Other attributes may include non-security-related features.

Pull Mode V. Push Mode

Network service 140 might operate in one of two modes with respect to target device 120: a "pull" mode or a "push" mode. Operating in one of these two modes is equivalent to "implementing one of a pull strategy or a push strategy." As an example of a pull strategy in the printing context, target device 120 might be a printing device and network service 140 provides a release code to source device 110 to be displayed to a user of source device 110. In this example, the user might enter the release code using a user interface at target device 120. If the release code is valid, then target device 120 prints a document that is associated with the release code. Prior to printing, this process might involve target device 120 sending the release code to network service 140 and receiving the associated electronic document from network service 140 in response. Therefore, in the pull strategy, the user is required to enter certain information at target device 120 in order for the printing to occur at target device 120.

In contrast to the pull strategy, network service 140 might instead operate in a "push" mode in that network service 140 does not wait for the user to enter certain information in order to send other information to target device 120. Rather, network service 140 sends information (such as a print job) to target device 120 without waiting for target device 120 to send certain information (e.g., a release code) to network service 140 and without requiring the user to enter any information (e.g., a release code) at target device 120.

An advantage of the pull strategy over the push strategy is that, in the pull strategy, a user is required to be present at target device 120 in order for network service 140 to send data to target device 120. In this way, any confidential information that is provided to target device 120 and "consumed" by the user (e.g., displayed to the user on a display or on a printed document) will not be accidently consumed by any other users that might be near target device 120.

An advantage of the push strategy over the pull strategy is that, in the push strategy, a user is not required to be present at target device 120 in order for network service 140 to send data to target device 120. In this way, fewer manual steps are required and, thus, fewer possible human errors, such as entering an incorrect release code. Another advantage of the push strategy over the pull strategy is that, in the push strategy, data that is to be transmitted from network service 140 to target device 120 does not have to be stored indefinitely. For example, in the print context under a pull strategy, network service 140 may store an electronic document indefinitely or for a certain period of time, but it is not clear how long is long enough to store an electronic document for a user. Also, there are security issues when storing electronic documents accessible to network service 140 or at target device 120.

One disadvantage with prior approaches is that a network service (such as a network print service) or a network device (such as a printing device) permanently operates in either a pull mode or a push mode, but never both. In other words, the network service or network device does not change between a pull mode and a push mode. Instead, the network service or network device is configured to only operate in a single mode, whether a pull mode or a push mode, for the life of the network service or the network device.

In an embodiment, network service 140 switches between a pull mode and a push mode based on one or more factors. For example, for one request initiated by a first source device (such as source device 110), network service 140 operates in a pull mode, but, for another request initiated by a second source device (which may be the same as the first source device), network service 140 operates in a push mode.

In an embodiment, the location of source device 110 relative to target device 120 is a factor in determining whether network service 140 operates in a pull mode or a push mode with respect to target device 120. For example, if source device 110 is within 10 meters of target device 120, then it is presumed that the user of source device 110 is within 10 meters of target device 120. Network service 140 uses this location information as a factor in determining whether to send certain data (e.g., a print job) to target device 120. The location factor may be reflected in one or more rules (e.g., reflected in table 600) that may indicate that if source device 110 and target device 120 are both within a particular geographical area, then the push strategy is implemented; otherwise, the pull strategy is implemented.

In an embodiment, whether source device 110 and/or target device 120 is certified is a factor in determining whether network service 140 operates in a pull mode or a push mode with respect to target device 120. The certification information used by network service 140 may be reflected in table 400. The certification factor may be reflected in one or more rules (e.g., reflected in table 600) that may indicate that if target device 120 and/or source device 110 is certified, then the push strategy is implemented; otherwise, the pull strategy is implemented.

Multiple Target Devices

In an embodiment, source device 110 causes data to be sent to multiple target devices. The sending of the data to a first target device may be concurrent with the sending of the data to a second target device that is different than the first target device. One example scenario in which this might occur is where a user desires to share a sensitive document, stored on the user's mobile device, with multiple business partners in a single meeting room, where each business partner has his/her own mobile device, such as a tablet computer. In this way, no paper documents need to be printed, distributed, or disposed.

In an embodiment, source device 110 sends multiple requests to network service 140, each request identifying a different target device. Alternatively, source device 110 sends, to network service 140, a single request that identifies multiple target devices.

Network service 140 may employ one or more of the techniques herein to determine whether to send data or instructions to each of the target devices. For example, network service 140 determines whether each target device satisfies one or more geographical criteria (e.g., being within a certain geographical location or being within a certain distance of source device 110). In one embodiment, if network service 140 determines that a target device does not satisfy the one or more geographical criteria, then network service 140 denies the request (e.g., does not send print data or instructions) with respect to only that target device. Alternatively, if network service 140 determines that any of the multiple target devices does not satisfy the one or more geographical criteria, then network service 140 denies the request with respect to all the multiple target devices.

As another example, network service 140 determines, for each target device, whether the target device satisfies one or more certification criteria before sending data or instructions to the target device. Similarly to the example above, if network service 140 determines that a target device does not satisfy the one or more certification criteria, then network service 140 denies the request (e.g., does not send print data or instructions) with respect to just that target device. Alternatively, if network service 140 determines that any of the multiple target devices does not satisfy the one or more geographical criteria, then network service 140 denies the request with respect to all the multiple target devices.

Additionally, network service 140 may determine whether each target device satisfies multiple types of criteria (e.g., geographical criteria, certification criteria, and/or other criteria) before allowing data or instructions to be sent to the target device.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 14 is a block diagram that illustrates a computer system 1400 upon which an embodiment may be implemented. Computer system 1400 includes a bus 1402 or other communication mechanism for communicating information, and a hardware processor 1404 coupled with bus 1402 for processing information. Hardware processor 1404 may be, for example, a general purpose microprocessor.

Computer system 1400 also includes a main memory 1406, such as a random access memory (RAM) or other dynamic storage device, coupled to bus 1402 for storing information and instructions to be executed by processor 1404. Main memory 1406 also may be used for storing temporary variables or other intermediate information during execution of instructions to be executed by processor 1404. Such instructions, when stored in non-transitory storage media accessible to processor 1404, render computer system 1400 into a special-purpose machine that is customized to perform the operations specified in the instructions.

Computer system 1400 further includes a read only memory (ROM) 1408 or other static storage device coupled to bus 1402 for storing static information and instructions for processor 1404. A storage device 1410, such as a magnetic disk, optical disk, or solid-state drive is provided and coupled to bus 1402 for storing information and instructions.

Computer system 1400 may be coupled via bus 1402 to a display 1412, such as a cathode ray tube (CRT), for displaying information to a computer user. An input device 1414, including alphanumeric and other keys, is coupled to bus 1402 for communicating information and command selections to processor 1404. Another type of user input device is cursor control 1416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane.

Computer system 1400 may implement the techniques described herein using customized hard-wired logic, one or more ASICs or FPGAs, firmware and/or program logic which in combination with the computer system causes or programs computer system 1400 to be a special-purpose machine. According to one embodiment, the techniques herein are performed by computer system 1400 in response to processor 1404 executing one or more sequences of one or more instructions contained in main memory 1406. Such instructions may be read into main memory 1406 from another storage medium, such as storage device 1410. Execution of the sequences of instructions contained in main memory 1406 causes processor 1404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1410. Volatile media includes dynamic memory, such as main memory 1406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1402. Transmission media can also take the form of acoustic or light waves, such as those generated during radio-wave and infra-red data communications.

Various forms of media may be involved in carrying one or more sequences of one or more instructions to processor 1404 for execution. For example, the instructions may initially be carried on a magnetic disk or solid-state drive of a remote computer. The remote computer can load the instructions into its dynamic memory and send the instructions over a telephone line using a modem. A modem local to computer system 1400 can receive the data on the telephone line and use an infra-red transmitter to convert the data to an infra-red signal. An infra-red detector can receive the data carried in the infra-red signal and appropriate circuitry can place the data on bus 1402. Bus 1402 carries the data to main memory 1406, from which processor 1404 retrieves and executes the instructions. The instructions received by main memory 1406 may optionally be stored on storage device 1410 either before or after execution by processor 1404.

Computer system 1400 also includes a communication interface 1418 coupled to bus 1402. Communication interface 1418 provides a two-way data communication coupling to a network link 1420 that is connected to a local network 1422. For example, communication interface 1418 may be an integrated services digital network (ISDN) card, cable modem, satellite modem, or a modem to provide a data communication connection to a corresponding type of telephone line. As another example, communication interface 1418 may be a local area network (LAN) card to provide a data communication connection to a compatible LAN. Wireless links may also be implemented. In any such implementation, communication interface 1418 sends and receives electrical, electromagnetic or optical signals that carry digital data streams representing various types of information.

Network link 1420 typically provides data communication through one or more networks to other data devices. For example, network link 1420 may provide a connection through local network 1422 to a host computer 1424 or to data equipment operated by an Internet Service Provider (ISP) 1426. ISP 1426 in turn provides data communication services through the world wide packet data communication network now commonly referred to as the "Internet" 1428. Local network 1422 and Internet 1428 both use electrical, electromagnetic or optical signals that carry digital data streams. The signals through the various networks and the signals on network link 1420 and through communication interface 1418, which carry the digital data to and from computer system 1400, are example forms of transmission media.

Computer system 1400 can send messages and receive data, including program code, through the network(s), network link 1420 and communication interface 1418. In the Internet example, a server 1430 might transmit a requested code for an application program through Internet 1428, ISP 1426, local network 1422 and communication interface 1418.

The received code may be executed by processor 1404 as it is received, and/or stored in storage device 1410, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
storing rule data that indicates, for each rule of a plurality of rules, one or more actions and a plurality of conditions that must be satisfied to perform the one or more actions of said each rule;
wherein the plurality of conditions includes at least a type of operation that is requested and one or more attribute values of a target device;
receiving, over a network, from a first requesting device, by a network service, a first request for first particular data to be processed by a particular target device that is different than the first requesting device and that is within a first network that is different than a second network in which the first requesting device is located;
identifying, by the network service, a first operation that is requested in the first request;
identifying, by the network service, one or more first attribute values of the particular target device;
identifying, by the network service, based on the first operation and the one or more first attribute values, a first rule of the plurality of rules that is indicated in the rule data;
identifying, by the network service, one or more first actions that are associated with the first rule;
causing, by the network service, the one or more first actions of the first rule to be performed;
after allowing the first operation to be performed with respect to the first particular data:
sending, to the particular target device, a request for one or more characteristics of the particular target device;
in response to the request, receiving the one or more characteristics from the particular target device;
storing, based on the one or more characteristics, one or more second attribute values that are associated with the particular target device;
after storing the one or more second attribute values:
receiving, from a second requesting device that is different than the particular target device and that is within a third network that is different than the first network in which the particular target device is located, by the network service, a second request for second particular data to be processed by the particular target device;
identifying, by the network service, a second operation that is requested in the second request;
identifying, by the network service, the one or more second attribute values of the particular target device;
identifying, by the network service, based on the second operation and the one or more second attribute values, a second rule, of plurality of rules indicated in the rule data, that is different than the first rule;
identifying, by the network service, one or more second actions that are associated with the second rule indicated in the rule data;
causing, by the network service, the one or more second actions of the second rule to be performed;
wherein the method is performed by one or more computing devices.

2. The method of claim 1, wherein the first operation includes at least one of sending the first particular data to the particular target device or causing a printed version of an electronic document reflected in the first particular data to be printed on a tangible medium.

3. The method of claim 1, wherein the one or more characteristics of the particular target device correspond to one or more security features of the particular target device.

4. The method of claim 1, wherein:
the first request is for one of a list of document names or to print a document;
the particular target device is a printing device;
the first particular data is one of the list of document names or a print job.

5. The method of claim 4, wherein:
the first request is to print a document;
the method further comprising:
identifying attribute data that indicates one or more attribute values of electronic print data that is associated with the document;
determining whether to allow the first operation to be performed on the first particular data based on comparing the attribute data associated with the electronic print data with the one or more first attribute values of the particular target device.

6. The method of claim 1, wherein:
the one or more characteristics of the particular target device are one or more second characteristics of the particular target device;
the method further comprising, prior to receiving the first request:
sending, to the particular target device, a third request for one or more first characteristics of the particular target device, wherein the one or more first characteristics are different than the one or more second characteristics;
in response to the third request, receiving, from the particular target device, characteristic data that indicates the one or more first characteristics of the particular target device;
determining the one or more first attribute values based on the one or more second characteristics.

7. The method of claim 1, wherein:
storing the one or more second attribute values comprises storing classification data that classifies the particular target device as not certified; and
the one or more second attribute values of the particular target device indicate whether the particular target device is classified as certified.

8. The method of claim 1, further comprising:
periodically sending requests to the particular target device for characteristics of the particular target device to determine whether one or more certification criteria are satisfied.

9. The method of claim 1, further comprising:
determining one or more attribute values of the first requesting device;
determining whether to allow the first operation to be performed based on the one or more attribute values of the first requesting device.

10. The method of claim 1, further comprising:
determining a location of the first requesting device; and
determining whether to allow the first operation to be performed based on the location of the first requesting device.

11. One or more storage media storing instructions which, when executed by one or more processors, cause:
storing rule data that indicates, for each rule of a plurality of rules, one or more actions and a plurality of conditions that must be satisfied to perform the one or more actions of said each rule;
wherein the plurality of conditions includes at least a type of operation that is requested and one or more attribute values of a target device;

receiving, over a network, from a first requesting device, by a network service, a first request for first particular data to be processed by a particular target device that is different than the first requesting device and that is within a first network that is different than a second network in which the first requesting device is located;

identifying, by the network service, a first operation that is requested in the first request;

identifying, by the network service, one or more first attribute values of the particular target device;

identifying, by the network service, based on the first operation and the one or more first attribute values, a first rule of the plurality of rules that is indicated in the rule data;

identifying, by the network service, one or more first actions that are associated with the first rule;

causing, by the network service, the one or more first actions to be performed;

after allowing the first operation to be performed with respect to the first particular data:
    sending, to the particular target device, a request for one or more characteristics of the particular target device;
    in response to the request, receiving the one or more characteristics from the particular target device;
    storing, based on the one or more characteristics, one or more second attribute values that are associated with the particular target device;

after storing the one or more second attributes:
    receiving, from a second requesting device that is different than the particular target device and that is within a third network that is different than the first network in which the particular target device is located, by the network service, a second request for second particular data to be processed by the particular target device;
    identifying, by the network service, a second operation that is requested in the second request;
    identifying, by the network service, the one or more second attribute values of the particular target device;
    identifying, by the network service, based on the second operation and the one or more second attribute values, a second rule, of plurality of rules that are indicated in the rule data, that is different than the first rule;
    identifying, by the network service, one or more second actions that are associated with the second rule indicated in the rule data;
    causing, by the network service, the one or more second actions to be performed.

12. The one or more storage media of claim 11, wherein the first operation includes at least one of sending the first particular data to the particular target device or causing a printed version of an electronic document reflected in the first particular data to be printed on a tangible medium.

13. The one or more storage media of claim 11, wherein the one or more characteristics of the particular target device correspond to one or more security features of the particular target device.

14. The one or more storage media of claim 11, wherein:
the first request is for one of a list of document names or to print a document;
the particular target device is a printing device;
the first particular data is one of the list of document names or a print job.

15. The one or more storage media of claim 14, wherein:
the first request is to print a document;
the instructions, when executed by the one or more processors, further cause:
    identifying attribute data that indicates one or more attribute values of electronic print data that is associated with the document;
    determining whether to allow the first operation to be performed on the first particular data based on comparing the attribute data associated with the electronic print data with the one or more first attribute values of the particular target device.

16. The one or more storage media of claim 11, wherein:
the one or more characteristics of the particular target device are one or more second characteristics of the particular target device;
the instructions, when executed by the one or more processors, further cause, prior to receiving the first request:
    sending, to the particular target device, a third request for one or more first characteristics of the particular target device, wherein the one or more first characteristics are different than the one or more second characteristics;
    in response to the third request, receiving, from the particular target device, characteristic data that indicates the one or more first characteristics of the particular target device; and
    determining the one or more first attribute values based on the one or more second characteristics.

17. The one or more storage media of claim 11, wherein:
storing the one or more second attribute values comprises storing classification data that classifies the particular target device as not certified; and
the one or more second attribute values of the particular target device indicate whether the particular target device is classified as certified.

18. The one or more storage media of claim 11, wherein the instructions, when executed by the one or more processors, further cause:
    periodically sending requests to the particular target device for characteristics of the particular target device to determine whether one or more certification criteria are satisfied.

19. The one or more storage media of claim 11, wherein the instructions, when executed by the one or more processors, further cause:
    determining one or more attribute values of the first requesting device;
    determining whether to allow the first operation to be performed based on the one or more attribute values of the first requesting device.

20. The one or more storage media of claim 11, wherein the instructions, when executed by the one or more processors, further cause:
    determining a location of the first requesting device;
    determining whether to allow the first operation to be performed based on the location of the first requesting device.

* * * * *